United States Patent [19]

Sama

[11] 4,290,883
[45] Sep. 22, 1981

[54] CLASSIFYING DEVICE FOR AGGREGATES IMMERSED IN A FLUID

[76] Inventor: Nicholas Sama, 19120 Bel Aire Dr., Miami, Fla. 33157

[21] Appl. No.: 812,487

[22] Filed: Jul. 5, 1977

[51] Int. Cl.³ .............................................. E04H 3/20
[52] U.S. Cl. .................................. 210/169; 210/196; 210/416.2; 15/1.7
[58] Field of Search .............. 210/169, 196, 265, 319, 210/304, 416.2; 209/158, 159, 461, 463, 465, 501; 15/1.7

[56] References Cited

U.S. PATENT DOCUMENTS 2,332,188  10/1943  Andrews ........................ 210/304 X

*Primary Examiner*—John Adee
*Attorney, Agent, or Firm*—Robert J. Van Der Wall

[57] ABSTRACT

A device for separating into two or more components an aggregate of various species of particles immersed in and settled at the bottom of a body of fluid, one application being the removal of biological debris settled on and within the gravel bed of an aquarium, without, however, removing the gravel.

The device, which is used in combination with an auxiliary pumping and filtering means, employs a separator chamber having a mouth kept close to or in contact with said aggregate, and accomplishes its purpose by a flow induced through said chamber via inlet and outlet ports therein, with no flow or only a minor flow in through the mouth, while dirt and debris are induced into the chamber by a turbulent action provided for therewithin, such that the dirt and debris are entrained and swept away by the flow, but not the denser gravel.

8 Claims, 5 Drawing Figures

CLASSIFYING DEVICE FOR AGGREGATES IMMERSED IN A FLUID

BACKGROUND OF THE INVENTION

1. Field of the Invention

This invention relates to a device for removing dirt and biological debris settled on and within the gravel bed of an aquarium, without however removing significant amounts of gravel therefrom.

2. Description of the Prior Art

Up to the present time, devices available for removing dirt and biological debris accumulated at the bottom of an aquarium have been mainly siphons or long pickup tubes connected to pumping and filtering mechanisms. However, since gravel beds are generally used to cover aquarium bottoms both for esthetic and biological purposes, the problem arises with these presently available devices that in removing the debris, one also removes prohibitively large amounts of gravel. Thus a very unsatisfactory situation arises in that the gravel bed must be carefully and slowly "skimmed" so as to not remove too much gravel. This generally results in a very poor cleaning action which in addition is both time consuming and vexing.

SUMMARY OF THE INVENTION

The present invention will eliminate the above-described problem in a simple and automatic way, little being required of the operator other than to guide the device along the gravel bed. This invention additionally provides the benefit that one is not limited to skimming the gravel bed surface; the bed may be cleaned throughout to its very bottom, separation of the debris from the gravel being accomplished automatically by the device.

The essential operating process of the present invention is as follows: A separator chamber immersed in the liquid of the aquarium to be cleaned has an opening or mouth, this mouth being kept close to or in contact with the gravel bed thereof when the device is in operation. A means is provided, mechanical or otherwise, to create a turbulent condition within the chamber. An outlet port in the chamber substantially removed from the mouth connects by way of appropriate tubulation to a pumping and filtering means such that liquid is drawn from the chamber through this outlet port, particulate matter is removed from the flow, and the liquid remaining returned to the chamber via an inlet port therein. Thus what operationally takes place is that the turbulent action within the chamber will serve to swirl dirt and debris lying on and in the gravel bed into the chamber, where it is swept along by the flow outward from the outlet port, the denser gravel being left relatively undisturbed.

The important feature of this invention, and this is its novelty, is that in actual operation no flow (or a small flow, as noted below) takes place from the body of fluid inwardly through the mouth of the chamber; essentially, the mouth serves only the purpose of exposing the gravel in the region of the mouth to the turbulent action within the chamber. It is easy to see that were any substantial net flow to take place through the mouth, removal of gravel would be inevitable.

The device as described thus far will have zero net flow through the chamber mouth. In this situation, the turbulence which is naturally propagated outside the chamber mouth can have the slightly undesirable effect of swirling some of the debris on the gravel bed away from the region of the mouth. This effect can be eliminated by a provision that a small portion of the flow entering the chamber do so via said mouth, so that a relatively small inward flow through the mouth and into the chamber will take place. This will have the effect of sweeping in debris in the vicinity of the mouth, without, however, sweeping in the denser gravel. This small sweeping effect can be accomplished in various ways, as described more fully hereinafter.

BRIEF DESCRIPTION OF THE DRAWING

The parts-numbering scheme in the drawing is such that the same number, whether plain, primed, or double-primed, always refers to identical or equivalent structure relative to the various embodiments.

DESCRIPTION OF THE PREFERRED EMBODIMENTS

The present invention can be divided into four distinct classes or types of embodiments, depending on the nature of the flow connection between the discharge side of the pumping and filtering means and the separator. Thus one may have (1) the entire flow returned to the separator chamber via the inlet ports; (2) most of the flow returned to the separator chamber via the inlet ports, with a small bypass flow inward through the chamber mouth; (3) all the flow returned to the body of liquid, whereupon it enters the separator chamber as two streams, i.e., through the mouth and through the inlet ports; (4) the entire flow directed out of the system into a receptacle or waste line, with a flow into the separator as in (3) from the body of liquid. These and other features will become evident from the following description.

Figure 1:
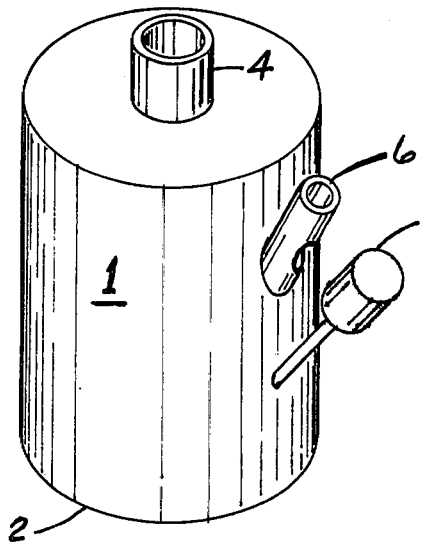
FIG. 1 shows a view in perspective of one type of preferred embodiment of the invention.
Figure 2:
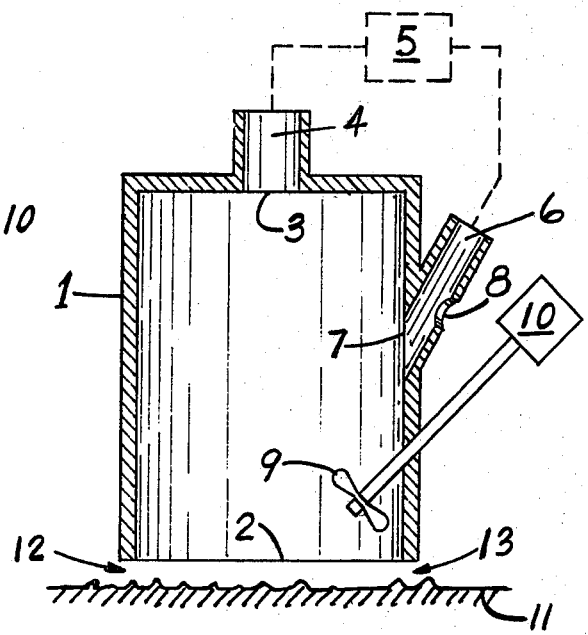
FIG. 2 shows a sectional elevation view of FIG. 1.

Referring to FIGS. 1 and 2, a chamber 1 immersed in a body of liquid is provided with an opening or mouth 2. An outlet port 3 leads to an outlet duct 4; the outlet duct 4 is by appropriate tubulation flow-wise connected to, and upstream of, a pumping and filtering means 5, shown by dashed lines in FIG. 2; the means 5 is by appropriate tubulation flow-wise connected to, and upstream of, the inlet duct 6; the inlet duct 6 leads to the inlet port 7 in the chamber 1. A small bypass opening 8 may optionally be provided somewhere in the return part of the circuit from the means 5 to the chamber 1, to produce a small bypass flow directly into the body of liquid. An agitator 9 is driven by some motive means 10 causing a turbulent action within the chamber 1.

In operation then, the chamber 1 is immersed in a body of liquid with the mouth 2 close to or in contact with the gravel bed 11. The turbulence provided by the agitator 9 will cause debris lying on and within the gravel bed 11 to be swirled into the chamber 1, where it is swept away by the flow outwardly through the port 3, and thence into the means 5. Particulate matter is removed by the means 5 and the flow returned to the chamber via the port 7. The small optional flow into the surrounding liquid produced by the bypass opening 8 will proceed inwardly through the mouth 2 as shown by the arrows 12 and 13, producing thereby a small sweeping effect which will cause debris to be swept away, but not the denser gravel.

The device can be considerably simplified by a second embodiment in which the agitator 9 and its drive 10 are eliminated provided, however, that the inlet duct 6 is geometrically disposed in such a way that the stream of liquid issuing therefrom into the chamber 1 will produce a turbulent effect therewithin. This may be accomplished by any one of many well-known ways, such as that shown in FIG. 2, in which turbulence is produced by forming the returning liquid stream in the form of a jet issuing into the chamber 1.

A third embodiment can also be described by FIG. 2 if the flow from the means 5, instead of being returned to the chamber via the inlet port 7, is wholly directed into the surrounding body of fluid, while the section of duct 6 is left as in FIG. 2. While this may seem to lead to a departure from the requirement of no significant net flow through the mouth 2, it is easily seen that when the mouth 2 is brought into contact with the gravel bed 11, the flow threat is effectively blocked off by the gravel bed, making the flow inward through the inlet duct a preferred one, and thus leading essentially to the same operational condition as the prior embodiments: turbulence will be set up in the chamber 1 by the inward flow through the duct 6, while the flow through the mouth 2, limited by the preferred path of the duct 6, is not enough to sweep gravel up and out through the outlet port 3. In this embodiment, then, the duct 6 acts as an automatic limiting device for the flow inward through the mouth 2, this flow dropping rapidly as the mouth is brought close to the gravel bed 11.

In the third embodiment, the connection on the discharge side of the means 5 suggests a simple modification which will not change the essentials of the operating process, yet may be useful in certain conditions. Thus one may replace the pumping and filtering means 5 by a simple pumping means if the discharge thereof is led out of the system into a bucket or waste line, so that a filtration process for the removal of debris from the flow can be eliminated. However, it is clear that with this arrangement, substantial amounts of liquid will be drained out of the system and lost; thus while viable, this arrangement is not as desirable in general as the closed circuit ones.

Figure 3:
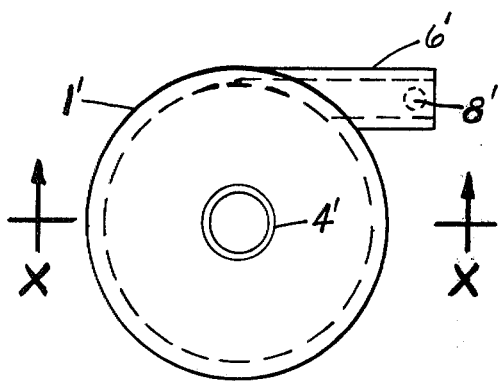
FIG. 3 is a plan view showing a second type of preferred embodiment of the invention.
Figure 4:
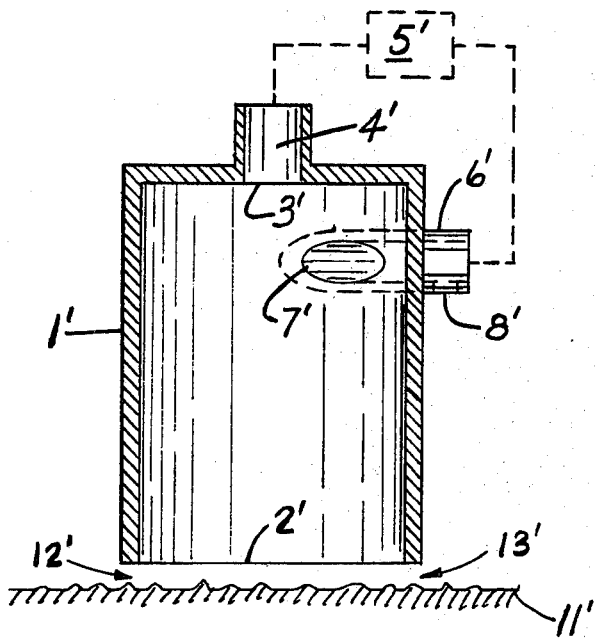
FIG. 4 is a section of an elevation view of FIG. 3, taken along the cut shown in FIG. 3 by X—X.

A fourth embodiment is shown in FIGS. 3 and 4, wherein all primed numbers correspond to equivalent apparatus in FIGS. 1 and 2. This embodiment shows the inlet dict 6' so disposed as to produce a rotational motion of the liquid within the chamber 1'. This introduces an important technical improvement over prior embodiments, for now in addition to the naturally greater resistance to flow of the denser gravel, there is the effect of cyclonic motion within the chamber 1'. This has the desirable and well-known effect of enhancing the separation of components, a principle widely utilized in centrifuges of all kinds. Thus by locating the outlet port 3' at the axis of the rotating liquid mass, one is able to more effectively separate the gravel from the less dense debris, the densest matter being hurled to the outer portions of the rotating liquid, and therefore away from the port 3'.

Figure 5:
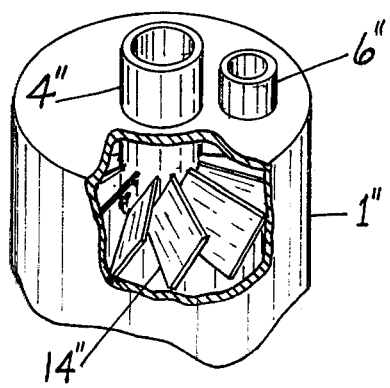
FIG. 5 shows a partially cut-away view in perspective of the upper portion of a third type of preferred embodiment.

As in the embodiments pertaining to FIGS. 1 and 2, FIGS. 3 and 4 can be used to represent various embodiments according as to the connection between the means 5' and the inlet duct 6'. The operation would in all cases be analogous to the embodiments pertaining to FIGS. 1 and 2, but with the added feature of rotational motion in the chamber 1'. Various other refinements of the device are of course obvious. For example, a multiplicity of inlet ducts could be used, or the rotational motion produced by making the return flow impinge upon directionalizing vanes. A particularly useful way of producing rotation would be by fashioning the input ducts in the form of helical passages coaxial with the separator chamber; this method is illustrated in FIG. 5, where the vanes 14" form, between adjacent vanes, the desired helical passages. In this embodiment, the duct 6" fills the function of a feeder duct for the assembly of helical ducts. Again, the rotational motion can be produced by an externally-driven impeller, much as in FIG. 1. Any of these methods can be utilized, the particular choice made being determined by the particulars of a given application, or by ease of construction of one method over another.

What is claimed is:

1. In combination with an external pumping and filtering apparatus, an aquarium gravel sweep comprising:
   a chamber having at least one inlet port, at least one outlet port, and an open mouth in movable close proximity to the aquarium gravel being swept;
   at least one outlet duct connecting each of said outlet ports to the intake of the pumping and filtering apparatus; and,
   at least one inlet duct connecting each of said inlet ports to the discharge of said pumping and filtering apparatus.

2. The aquarium gravel sweep of claim 1 wherein at least one inlet duct discharges into the chamber through an inlet port therein to cause turbulence within the chamber to entrain dirt and biological debris on and within aquarium gravel being swept.

3. The aquarium gravel sweep of claim 1 wherein at least one outlet port is remote from the open mouth to minimize disturbance and entrainment of gravel being swept.

4. The aquarium gravel sweep of claim 1 which further comprises externally powered agitation means within the chamber to create turbulence therein.

5. The aquarium gravel sweep of claim 1 wherein at least one inlet duct intersects the chamber tangentially to create rotational flow within the chamber.

6. The aquarium gravel sweep of claim 1 which further comprises directionalizing vanes within the chamber to create rotational flow therein.

7. The aquarium gravel sweep of claim 1 which further comprises at least one bypass opening in at least one inlet duct to recirculate less flow to the chamber than was drawn therefrom by all outlet ducts.

8. The aquarium gravel sweep of claim 7 wherein at least one bypass opening is of variable size to control the magnitude of bypass flow.

* * * * *